(12) United States Patent
Sambhwani et al.

(10) Patent No.: US 8,121,632 B2
(45) Date of Patent: Feb. 21, 2012

(54) SUITABLE TRIGGER MECHANISM TO CONTROL NEW CELL IDENTIFICATION IN UE WHEN IN DRX MODE

(75) Inventors: Sharad Deepak Sambhwani, San Diego, CA (US); Mehmet Yavuz, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 12/364,880

(22) Filed: Feb. 3, 2009

(65) Prior Publication Data

US 2009/0203376 A1    Aug. 13, 2009

Related U.S. Application Data

(60) Provisional application No. 61/026,125, filed on Feb. 4, 2008.

(51) Int. Cl.
*H04B 7/00* (2006.01)

(52) U.S. Cl. ........................................ 455/525

(58) Field of Classification Search .................. 455/525
See application file for complete search history.

(56) References Cited

U.S. PATENT DOCUMENTS

2007/0133479 A1    6/2007    Montojo et al.

FOREIGN PATENT DOCUMENTS

| EP | 1313336 | 5/2003 |
| WO | WO2007066875 | 6/2007 |
| WO | WO2007077530 | 7/2007 |
| WO | WO2007082934 | 7/2007 |

OTHER PUBLICATIONS

International Search Report and Written Opinion—PCT/US2009/033085, International Search Authority—European Patent Office—Nov. 12, 2009.

*Primary Examiner* — Lincoln Donovan
*Assistant Examiner* — Daniel Rojas
(74) *Attorney, Agent, or Firm* — D. Scott Juneau

(57) ABSTRACT

A cell identification method is provided. The method includes determining a reception state in a wireless device and comparing a reception cycle to a subframe parameter in the wireless device. The method also includes identifying a subsequent wireless cell within a predetermined time of the comparison.

26 Claims, 12 Drawing Sheets

SUITABLE TRIGGER MECHANISM TO CONTROL NEW CELL IDENTIFICATION IN UE WHEN IN DRX MODE

CROSS REFERENCE TO RELATED APPLICATIONS

This application claims the benefit of U.S. Provisional Patent Application No. 61/026,125, entitled SUITABLE TRIGGER MECHANISM TO CONTROL NEW CELL IDENTIFICATION IN UE WHEN IN DRX MODE, and filed on Feb. 4, 2008, the entirety of which is incorporated herein by reference.

BACKGROUND

I. Field

The following description relates generally to wireless communications systems, and more particularly to parameters and protocols to adjust cell identification times in order to facilitate power conservation in mobile devices yet enable suitable cell identification performance.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

One aspect of wireless communications performance involves the ability of a wireless device to be able to switch off periodically in order to conserve power. This period of inactivity or state is referred to as discontinuous reception or DRX. Ideally, a wireless device could keep this period as long as possible in order to promote long battery life between charges. However, if the device is kept in the idle or off state for too long of a time, it is possible to miss desired communications to area cells during periods of device mobility.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to adjust new cell identification times in wireless receivers in order to facilitate cell detection during periods of mobility and provide a reasonable time for power conservation. Discontinuous reception (DRX) performance is dynamically adjusted in the receiver in order to increase the amount of time the receiver has to identify neighboring cells. Various network parameters are analyzed to determine the adjustments, where the parameters relate to downlink DRX active periods and DRX cycle times at the receiver. Another parameter is the system frame number (SFN) which is the identifier for a newly detectable cell. In general, the DRX time is adjusted to allow the SFN to be decoded within a desired period of time (e.g., within a predetermined number of subframe periods). By adjusting the DRX switching times in this manner, new cell detection is enhanced—especially during higher mobility speeds, while power can still be conserved at the receiver.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided support efficient detection of new wireless cells and mitigate power losses in wireless devices. In one aspect, a cell identification method is provided. The method includes determining a reception state in a wireless device and comparing a reception cycle to a subframe parameter in the wireless device. The method also includes identifying a subsequent wireless cell within a predetermined time of the comparison. The predetermined time can be dynamically adjusted to account for mobility speeds or other environmental considerations (e.g., noise, network congestion, and so forth).

Figure 1:
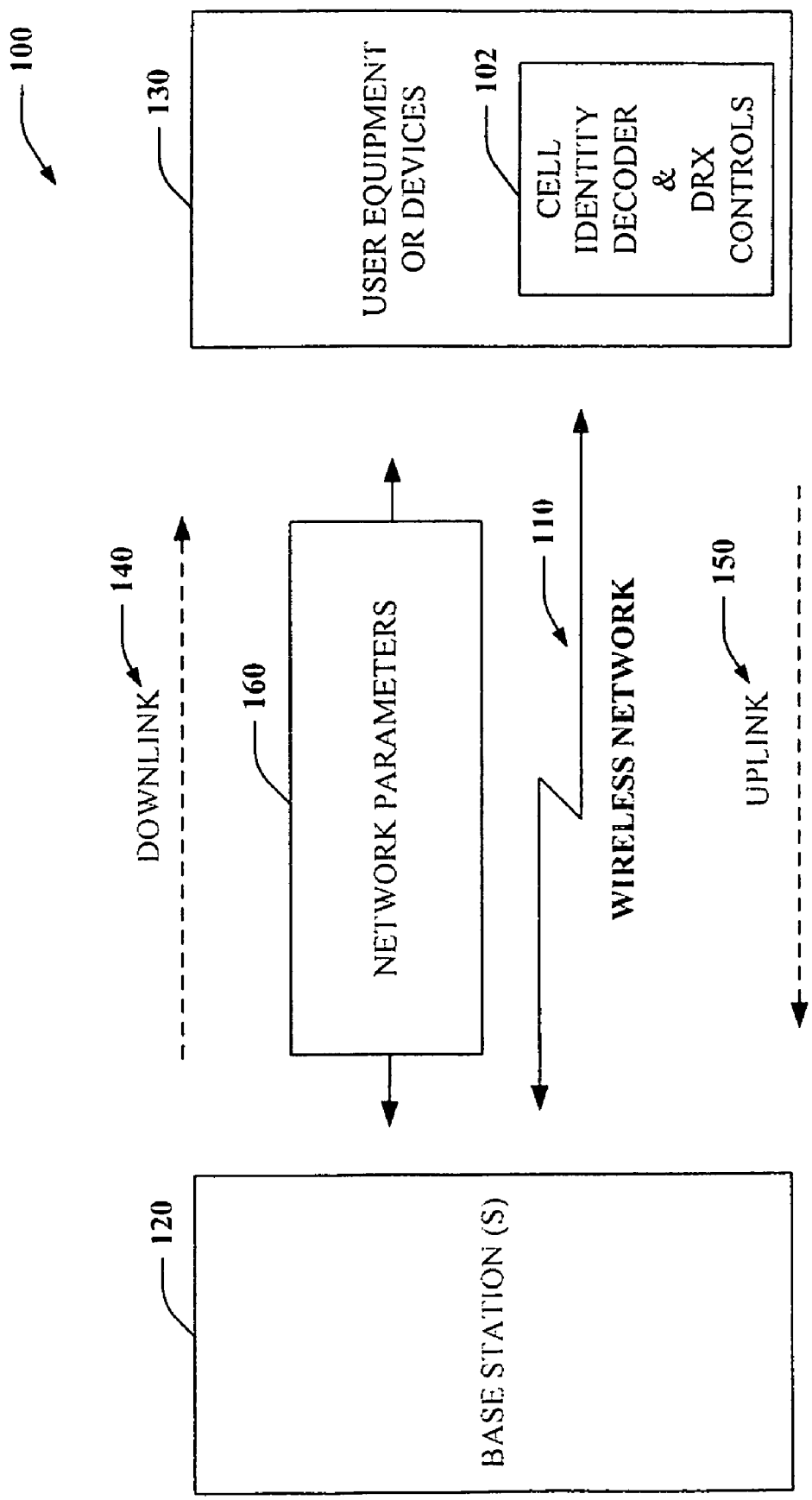
FIG. 1 is a high level block diagram of a system that employs a cell identity decoder and DRX controls to detect new wireless cells and mitigate power in user equipment.

Referring now to FIG. 1, a system 100 employs a cell identity decoder 102 having DRX controls to detect new wireless cells and mitigate power in user equipment. The system 100 includes one or more base stations 120 (also referred to as a node, evolved node B-eNB) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 (DL) and receives data via uplink 150 (UL). Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the cell identification described herein. Before proceeding, it is noted that various acronyms are employed for brevity. The acronyms, if not defined initially are defined at the end of the specification.

The system 100 enables devices to adjust new cell identification times in order to facilitate cell detection during periods of mobility and provide a reasonable time for power conservation. Discontinuous reception (DRX) performance is dynamically adjusted in the device 130 in order to increase the amount of time the device has to identify neighboring cells. Various network parameters 160 are analyzed to determine the adjustments, where the parameters relate to downlink DRX active periods and DRX cycle times at the device 130. Another parameter 160 is the system frame number (SFN) which is the identifier for a newly detectable cell. In general, the DRX time is adjusted to allow the SFN to be decoded at 102 within a desired period of time (e.g., within a predetermined number of subframe periods). By adjusting the DRX switching times in this manner, new cell detection is enhanced—especially during higher mobility speeds, while power can still be conserved at the receiver.

In general, continuous packet connectivity (CPC) over the network 110 introduces the possibility that the UE 130 may switch its receiver off (DRX) during periods of inactivity for power saving purposes. One specification requires the UE 130 to be able to identify and decode the SFN of a new detectable cell belonging to the monitored set within a time $T_{identify\ intra}$. If a status signal e.g., DL_DRX_Active=1 for example, it may be possible for $T_{identify\ intra}$ to have a value of up to 6 seconds, for extreme due to continuous packet connectivity parameterizations which could affect mobility and performance.

In order to solve the performance and power problems, various parameters can be adjusted based in part upon network studies that are described below. Thus, when the status DL_DRX_Active=1, the UE 130 identifies and decodes the SFN of a new detectable cell within a cell identification time of 800 milliseconds (ms) (or other time) when the UE DRX cycle <10 subframes and 1.5 seconds (s) when the UE DRX cycle >10 subframes. It is to be appreciated that other time ranges could be selected (e.g., up to 200 ms low and up to 4 seconds high). Alternatively, the decoding time can be dynamically set where the UE adjusts the times based on currently detected conditions or other considerations (e.g., policy settings in the mobile device, for example, during rush hour utilize these time settings). The following describes various nuances with respect to other parameterizations that may be employed across the wireless network.

During the CELL_DCH state, the UE 130 measures identified intra frequency cells and searches for new intra frequency cells in the monitoring set. In case the network 110 requests the UE 130 to report detected set cells, the UE can also search for intra frequency cells outside the monitored and active set. Cells, which are neither included in the active set nor in the monitored set, and are identified by the UE 130 belong to the detected set according to one specification. If compressed mode pattern sequences are activated, intra frequency measurements can be performed between the transmission gaps concurrently for data reception from the active set cell/s.

If DL_DRX_Active=1, and the UE is performing DRX, intra frequency measurements can be performed when the receiver is active, to data reception from the active set cell/s.

If DL_DRX_Active=0, the UE can identify and decode the SFN of a new detectable cell belonging to the monitored set within:

$$T_{identify\ intra} = \operatorname{Max}\left\{800, T_{basic\ identify\ FDD, intra} \cdot \frac{T_{Measurement\ Period, Intra}}{T_{Intra}}\right\} ms$$

In general, and according to the claimed subject matter, if DL_DRX_Active=1 and the UE DRX cycle <10 subframes, the UE can identify and decode the SFN of a new detectable cell belonging to the monitored set within $T_{identify\ intra}$=800 ms (also referred to as time A). If DL_DRX_Active=1 and the UE DRX cycle $\geq$10 subframes, the UE can identify and decode the SFN of a new detectable cell belonging to the monitored set within $T_{identify\ intra}$=1.5 s (also referred to as time b). It is to be appreciated that other values can be configured or dynamically set for time A and/or time B.

A cell is considered detectable when:

CPICH Ec/Io >−20 dB if DL_DRX_Active=0, or CPICH Ec/Io $\geq$−17 dB if DL_DRX_Active=1, SCH_Ec/Io >−20 dB if DL_DRX_Active=0, or SCH Ec/Io $\geq$−17 dB if DL_DRX_Active=1, for at least one channel tap and SCH_Ec/Ior is divided between primary synchronization code and secondary synchronization code. When L3 filtering is used an additional delay can be expected.

In case of conflict, when a compressed gap sequence is activated, the UE may choose to prioritize the SFN decoding. The UE shall be able to identify a new detectable cell not belonging to the monitored set within: $T_{identify\ detected\ set}=30$ s when CPICH Ec/Io >−20 dB, SCH_Ec/Io >−17 dB and SCH_Ec/Ior is divided between primary synchronization code and secondary synchronization code. When L3 filtering is used an additional delay can be expected.

When the UE is supporting IPDL measurements and when idle periods with a length of 1 slot are scheduled, the UE physical layer can identify a new cell and report SFN-SFN observed time difference type 2 measurement within $$T_{identify\_IPDL} = \text{Max}\{T_{Measurement\_Period\ Intra}, T_{IPDL}\}\ \text{ms}$$

where $T_{Measurement\_Period\ Intra}$=The measurement period for Intra frequency CPICH measurements and $T_{IPDL}$ depends on the Search Window Size given in UE positioning OTDOA neighbor cell info as given in Table 1 below:

TABLE 1

| Search Window Size | $T_{IPDL}$ |
| --- | --- |
| less than or equal to +/−40 chips | Time over which 4 consecutive IPDL gaps occur |
| +/−80 chips | Time over which 8 consecutive IPDL gaps occur |

In the CELL_DCH state, the measurement period for intra frequency measurements is 200 ms, for example. When no transmission gap pattern sequence is activated and DL_DRX_ Active=0, the UE is capable of performing CPICH measurements for 8 identified-intra-frequency cells of the monitored set and/or the active set, and the UE physical layer is capable of reporting measurements to higher layers with the measurement period of 200 ms. When one or more transmission gap pattern sequences are activated, and/or DL_DRX_Active=1, the UE is capable of performing CPICH measurements for at least $Y_{measurement\ intra}$ cells, where $Y_{measurement\ intra}$ is defined in the following equation.

If the UE has identified more than $Y_{measurement\ intra}$ cells, the UE shall perform measurements of identified cells but the reporting rate of CPICH measurements of cells from the UE physical layer to higher layers may be decreased.

$$Y_{measurement\ intra} = \text{Floor}\left\{X_{basic\ measurement\ FDD} \cdot \frac{T_{Intra}}{T_{Measurement\ Period, Intra}}\right\} \text{cells}$$

where $X_{basic\ measurement}$ FDD=8 (cells)

$T_{Measurement\_Period\ Intra}$=200 ms. This is the measurement period for Intra frequency CPICH measurements.

$T_{Intra}$: This is the time that is available for intra frequency measurements, during the measurement period with an arbitrarily chosen timing. If DL_DRX_Active=1, and the UE is performing DRX, intra frequency measurements are assumed to be performed when the receiver is guaranteed to be active, and concurrently to data reception from the active set cell/s. If DL_DRX_Active=0 then $T_{basic\_identify\_FDD}$, intra=800 ms, or if DL_DRX_Active=1 then $T_{basic\_identify\_FDD}$, intra=300 ms. This is the time period used in the intra frequency equation where the allowed time for the UE to identify a new FDD cell is defined.

The UE 130 is capable of performing CPICH measurements for at least 1 detected intra-frequency cell, in the detected set, and the UE physical layer is capable of reporting measurements to higher layers with the measurement period of 10 s, for example.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g. communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
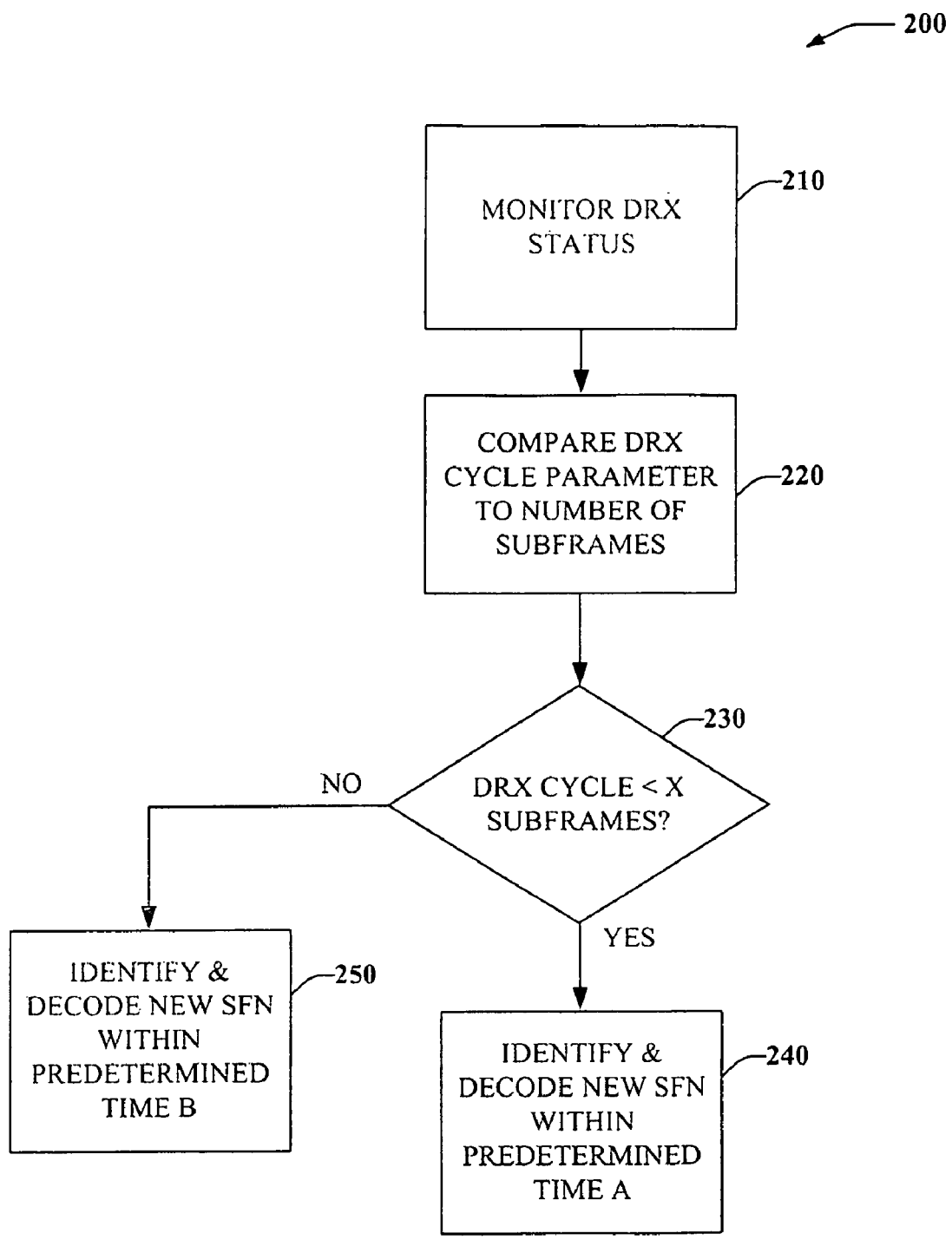
FIG. 2 is a flow diagram that illustrates a wireless cell identification method.

Referring now to FIG. 2, a wireless communications methodology is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 210, DRX status is monitored by a wireless device. As noted previously, such status can be monitored on the downlink channel and indicate the active state of the device. At 220, a DRX cycle parameter is compared to a given number of subframes (e.g., 10 subframes). At 230, if the DRX cycle parameter is below a given threshold (e.g., below 10 subframes), then the process proceeds to 240. At 240, an SFN is identified and decoded within a predetermined time A. As noted previously, one example time for time A is 800 ms. If the DRX cycle parameter is greater than or equal to a predetermined number of subframes at 230, the process proceeds to 250. At 250, an SFN is identified and decoded within a predetermined time B. As noted previously, one example time for the time B is 1.5 s. Such thresholds can be changed manually or dynamically. For instance, the time B at 250 could be adjusted to 3 s or other values. A plurality of differing thresholds can be set. In general, the process 200 is guided by the following equations:

If DL_DRX_Active=1 (at 210) and the device DRX cycle <10 subframes (at 230), the device should identify and decode the SFN of a new detectable cell belonging to the monitored set within $T_{identify\_intra}$=800 ms, for example. If DL_DRX_Active=1 (at 210) and the device DRX cycle ≧10 subframes (at 230), the device should identify and decode the SFN of a new detectable cell belonging to the monitored set within $T_{identify\_intra}$=1.5 s, for example.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

FIGS. 3-7 are diagrams that illustrate various environmental considerations relating to cell identification parameter adjustment and are collectively described herein. The choice of new cell identification time for UE's with DRX capability makes for an interesting compromise between battery life and performance in mobility environments. In general, when DRX is active, a different $T_{basic\_identify}$ (referred to as $T_{identify\_intra}$ above) could be used which allows some additional opportunities for power saving. One aspect would be that the actual identification time is not further scaled by either the actual receiver activity factor, or some signaled activity factor. It should be scaled for any inter frequency measurement gaps. From field studies performed, a suitable $T_{basic\_identify}$ when DRX is active could be of the order of 3 seconds to allow for some power saving opportunity while still giving reasonable mobility performance. A threshold can be added such as CPC-Sintra for enhanced UE DRX. However, the benefits of such a scheme should be further understood, since at least the CPICH of the serving and active set cells may still need to be measured fairly frequently to ensure that they have not become degraded.

Figure 3:
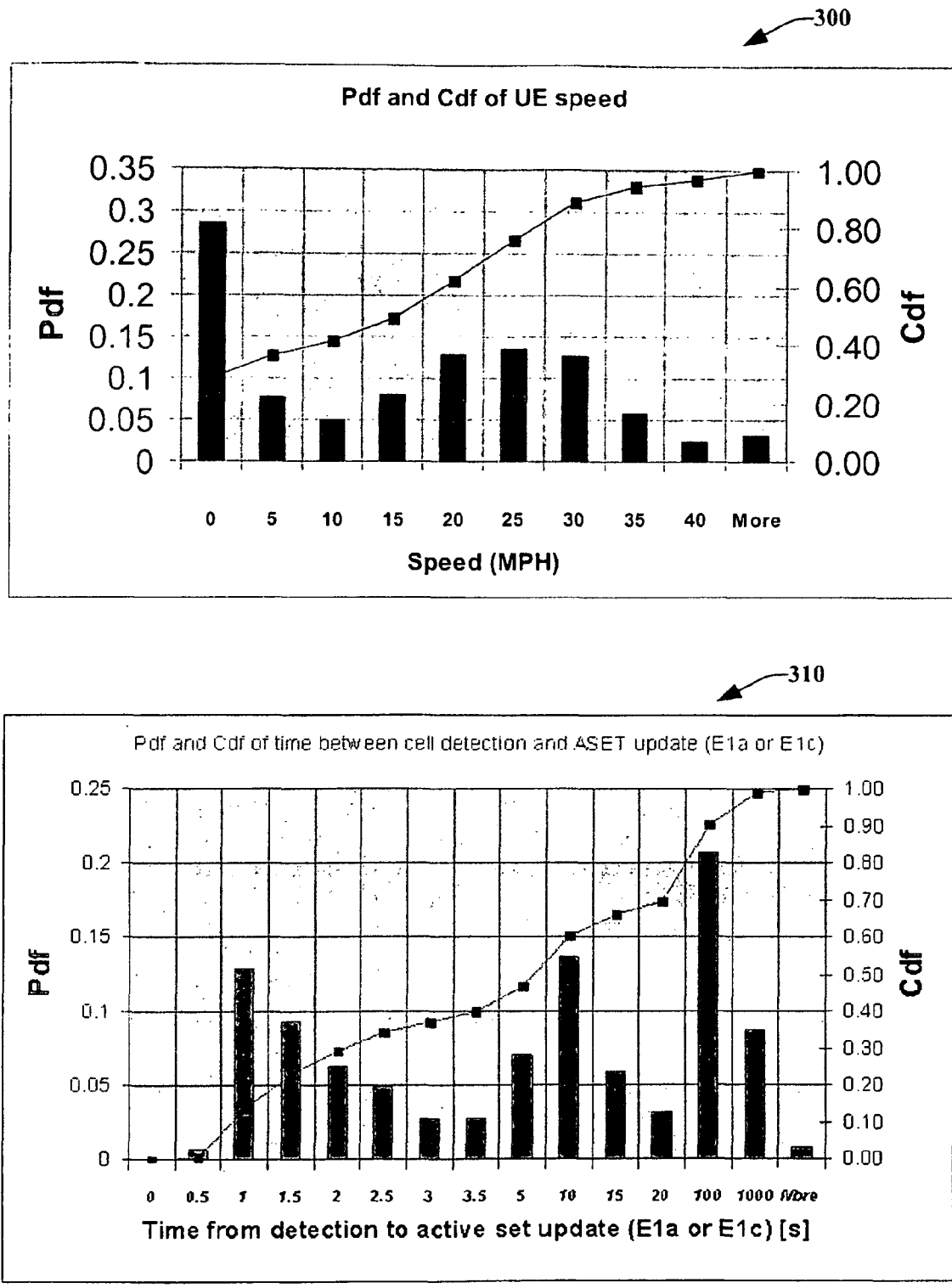
FIGS. 3-7 are diagrams that illustrate various environmental considerations relating to cell identification parameter adjustment.
Figure 4:
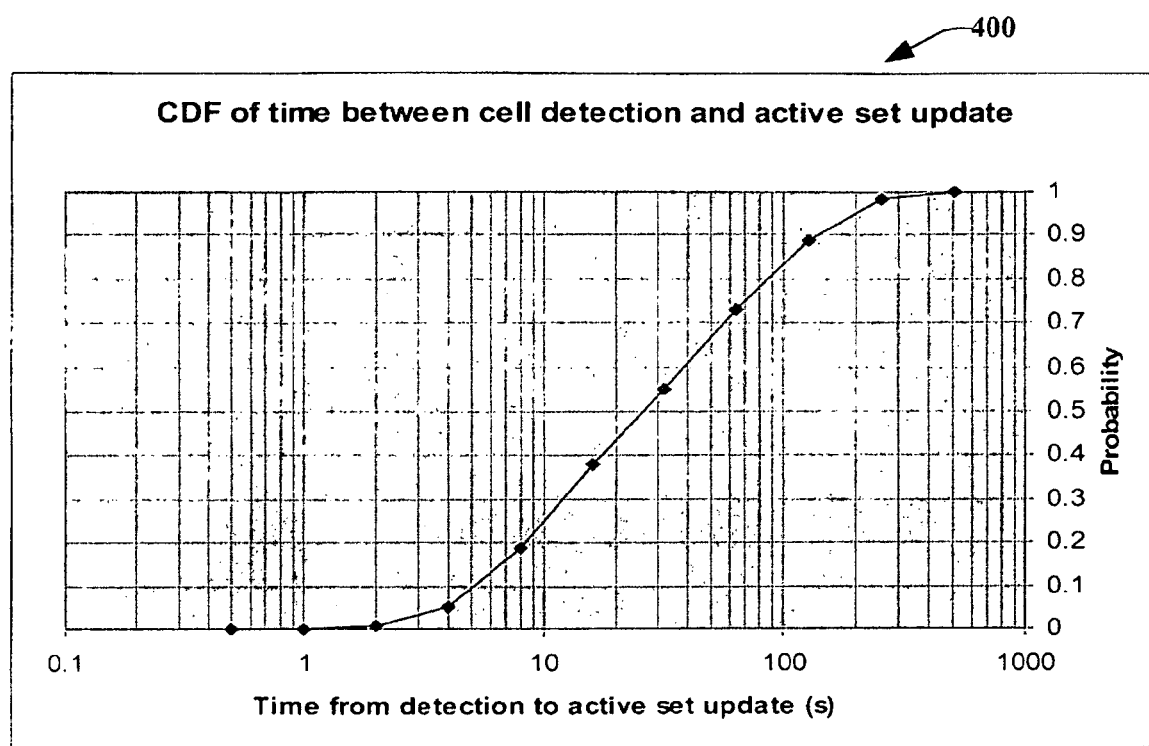

The following data represented in FIGS. 3-7 represents a mix of stationary and mobility environment as shown at 300 of FIG. 3. At 310 of FIG. 3, the pdf and cdf of the time taken from the detection of a new cell to the active set update is illustrated (due to either Event 1A or Event 1C) from the measurement data. FIG. 4 at 400 illustrates a similar statistic as FIG. 3 but from a different city (London, UK). The cdf's demonstrate a similar trend. However, note a difference in the medians (6 seconds v/s 25 seconds), as well as at the 10 percentile point and below between the 2 cdf's. In particular, observe the following:

The probability that time from detection of a cell to active set update (ASU) is between 0.5 s and 1 s equals 12.5%

The probability that time from detection of a cell to ASU is between 1 s and 1.5 s equals 9%.

Figure 5:
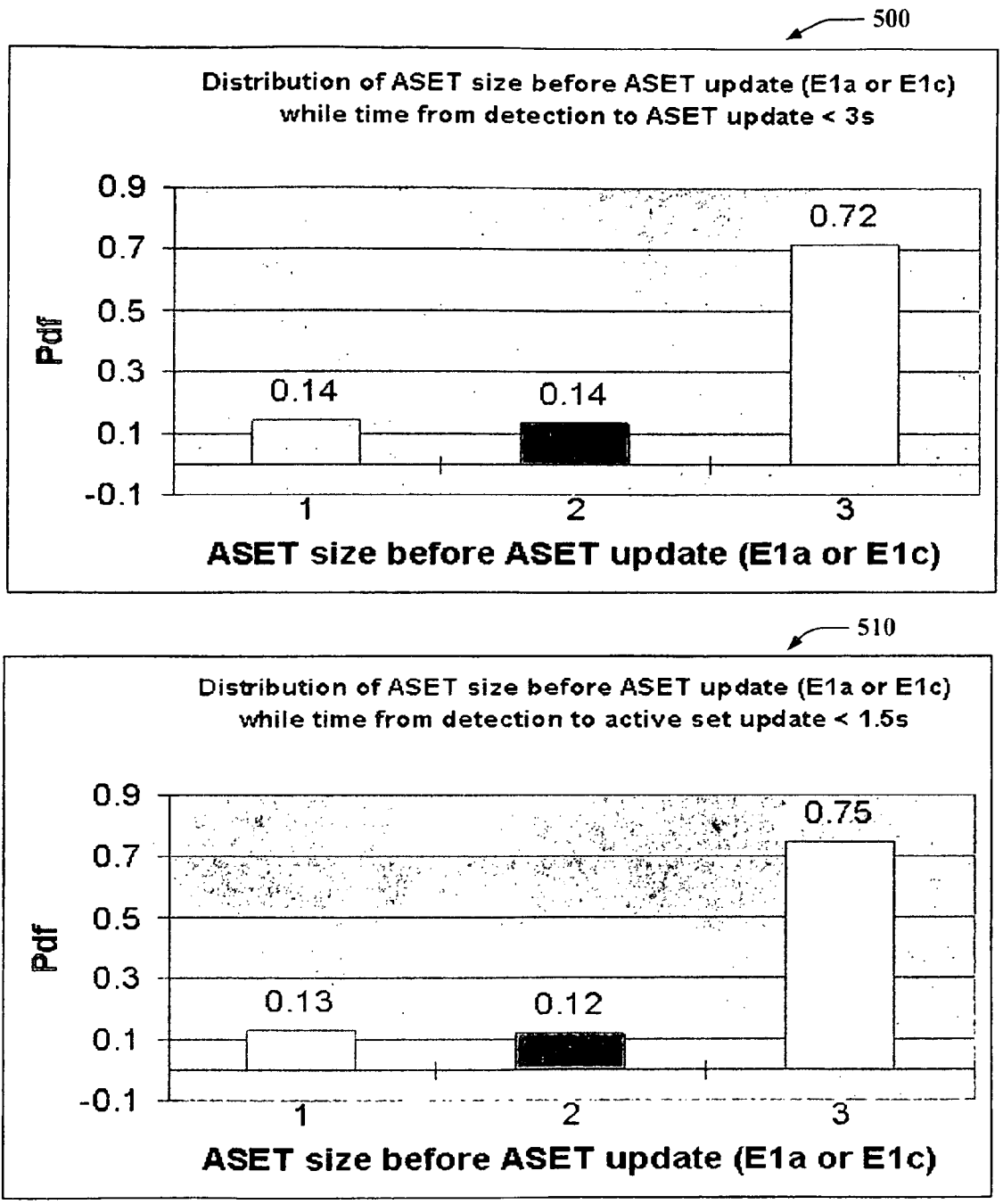

Furthermore, at diagrams 500 and 510 of FIG. 5, the distribution of the active set size is plotted before the ASU while time from detection to ASU is <3 s and <1.5 s respectively.

At 510 of FIG. 5, a real time service such as CS voice over HS or VoIP in HS mode can be deployed. When the time from new cell identification to the time the cell is added to the active set, a fair percentage (14%) of time, the active set size is equal to 1. Now in HS-mode, there is generally no soft handoff on the DL. Furthermore, when the active set size is equal to 1, there is generally no scope for a serving cell change in case the serving cell turns weak, unless the new cell is detected in time.

Figure 6:
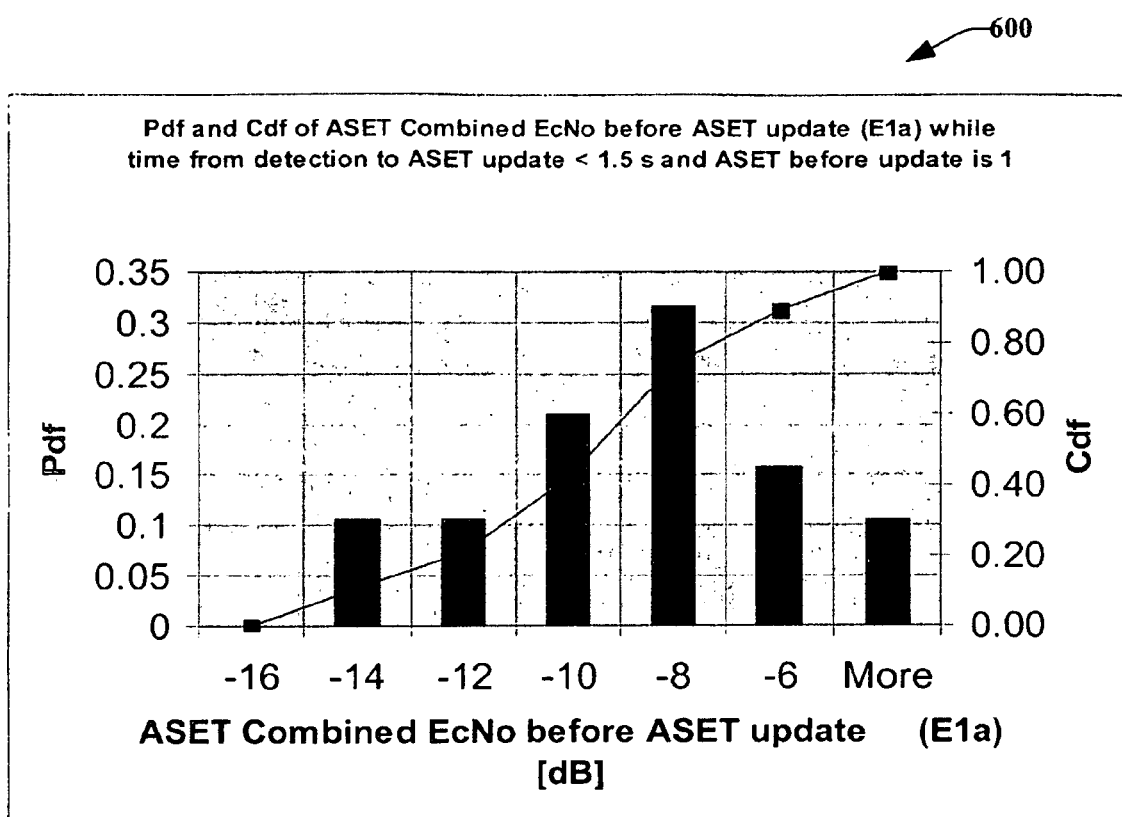
Figure 7:
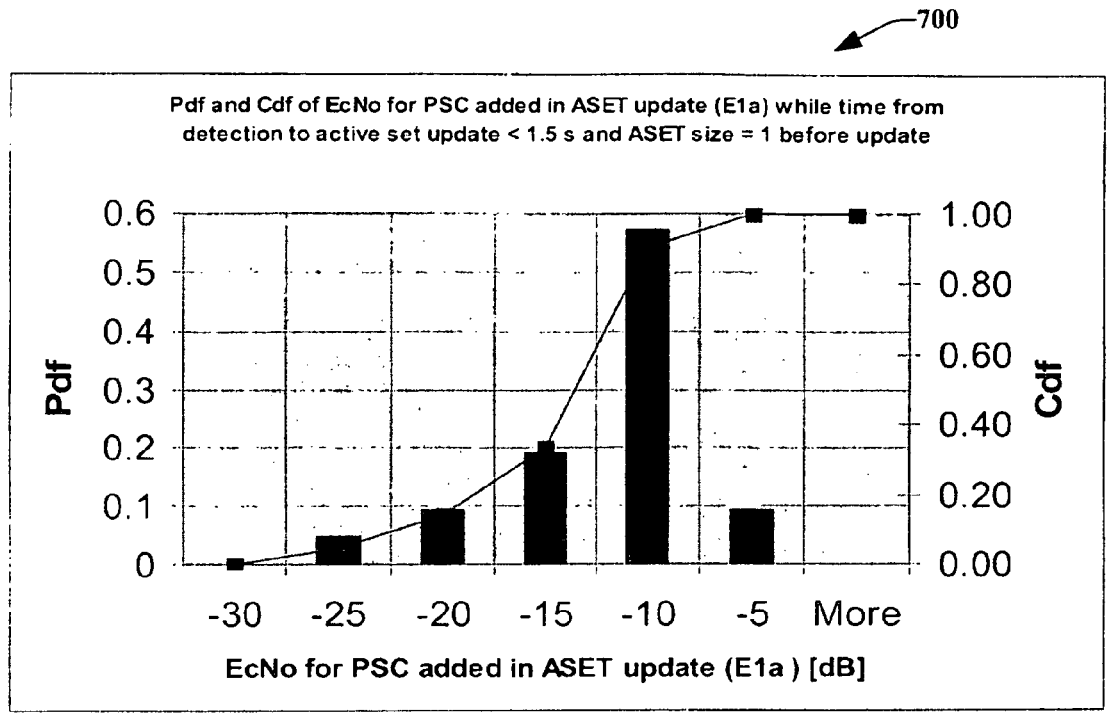
Figure 7:
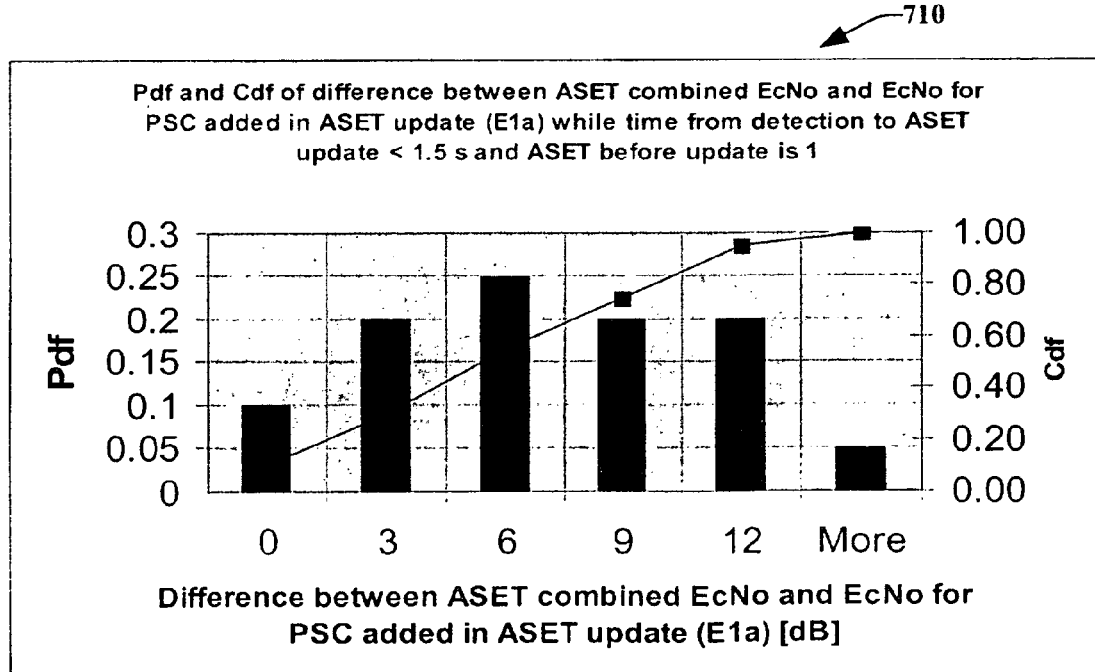

At 600 of FIG. 6, and 700 and 710 of FIG. 7, the following items are illustrated:

The pdf/cdf of the serving cell Ec/No before the active set update (ASU) while time from detection to active set update <1.5 seconds and active set size=1.

The pdf/cdf of the new cell's Ec/No before the new cell is added to active set while time from detection to active set update <1.5 seconds and active set size=1.

The pdf/cdf of the difference in the Ec/No between serving cell and the new cell (Serving/New) before the active set update (ASU) while time from detection to active set update <1.5 seconds and active set size=1. ASET is an acronym for active set size.

From FIGS. 6 and 7, observe for the case when active set size=1, at the time of active set update, while time from detection to ASU <1.5 s, the following:

There is a 10% probability the neighbor cell is comparable to the serving cell (0 dB) and 20% probability that the neighbor cell is within 3 dB of the serving cell.

The probability Ec/No of the new cell at the time of ASU >−15 dB=~65%

This suggests that if further delay were allowed in new cell identification, in cases when the active set size=1, the link might be vulnerable to the interference caused by the new cell, which in turn could lead to high call drop rates in services such as CS over HS and VoIP.

Figure 8:
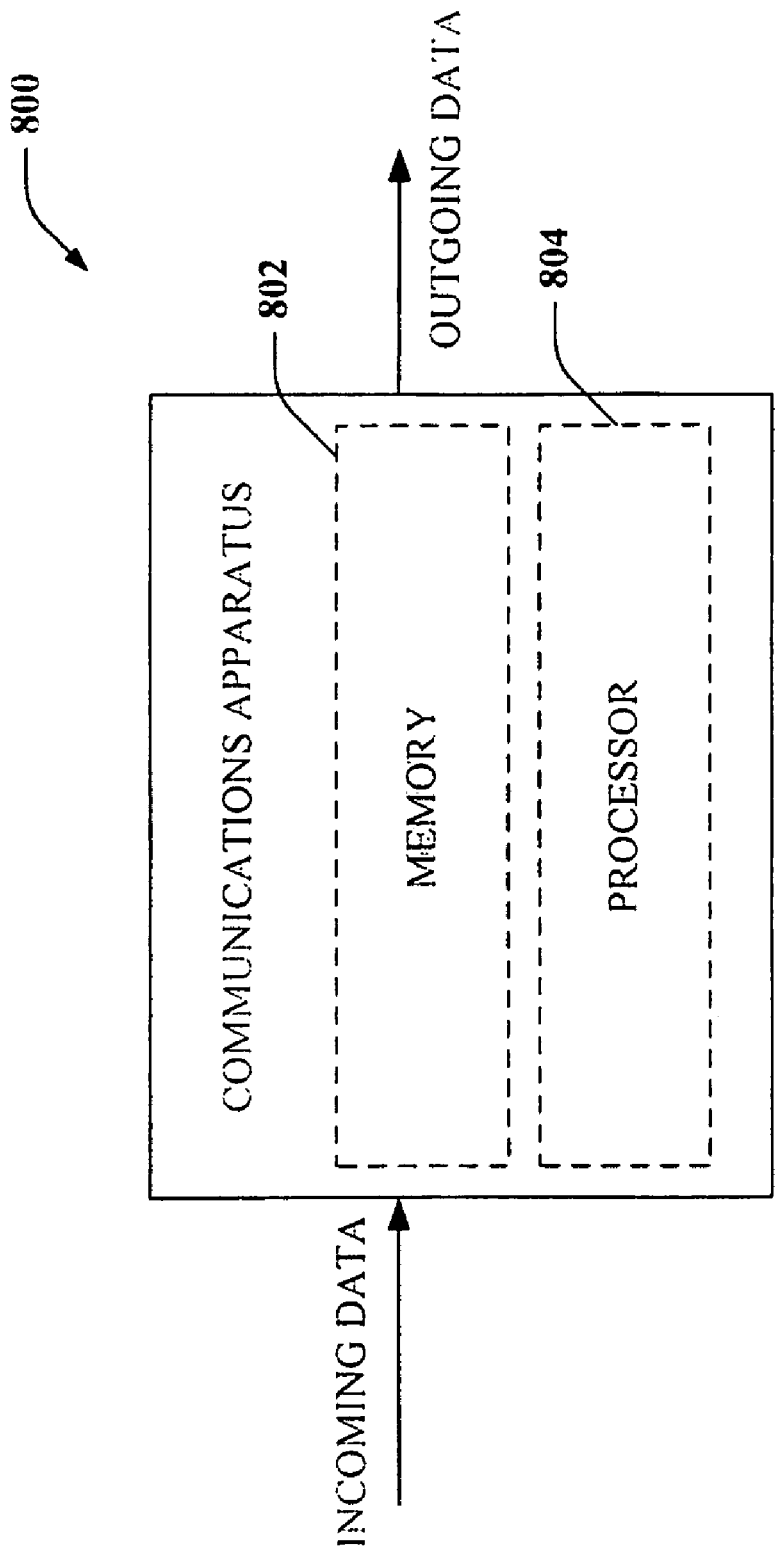
FIG. 8 illustrates an example communications apparatus for cell identification.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
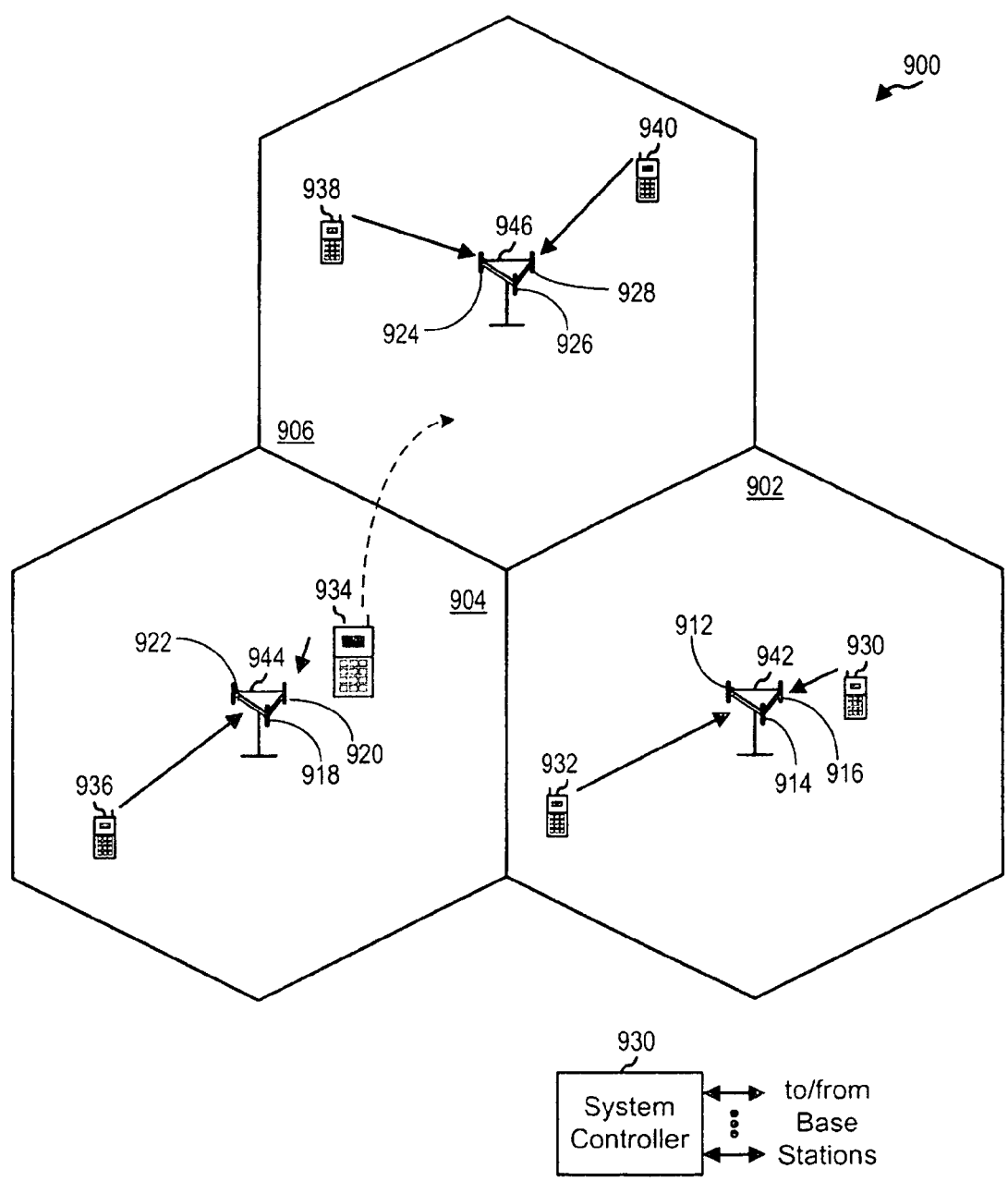
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
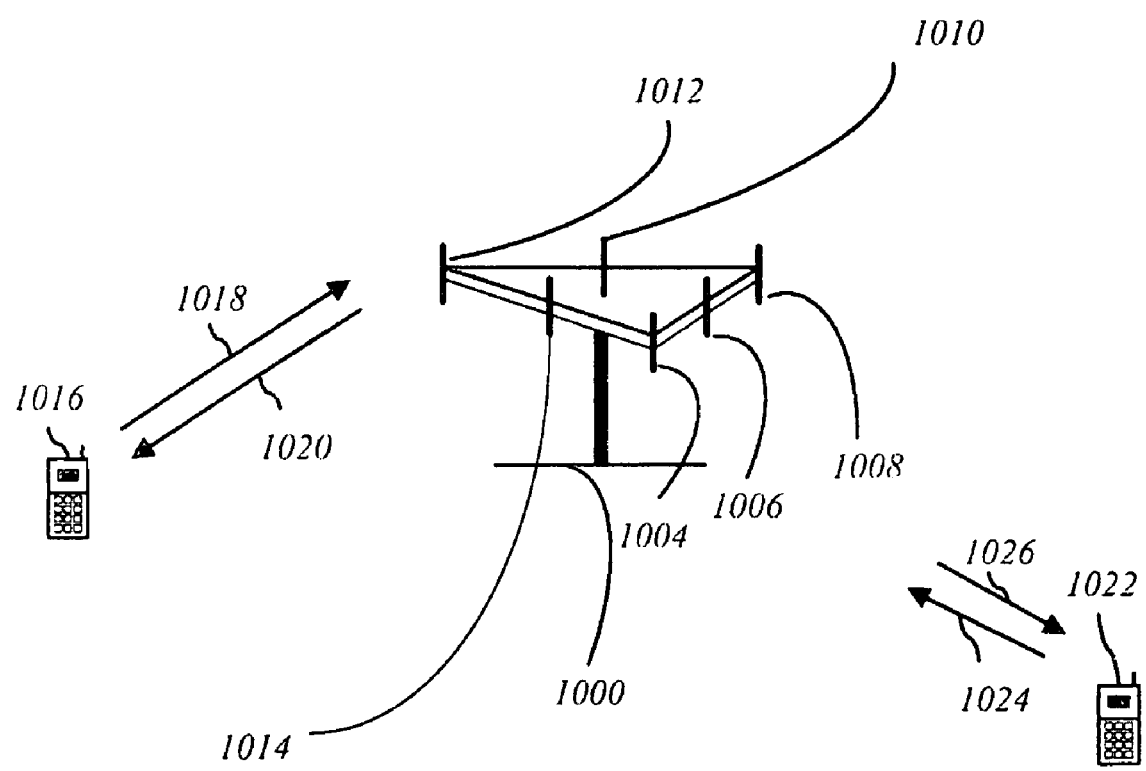
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
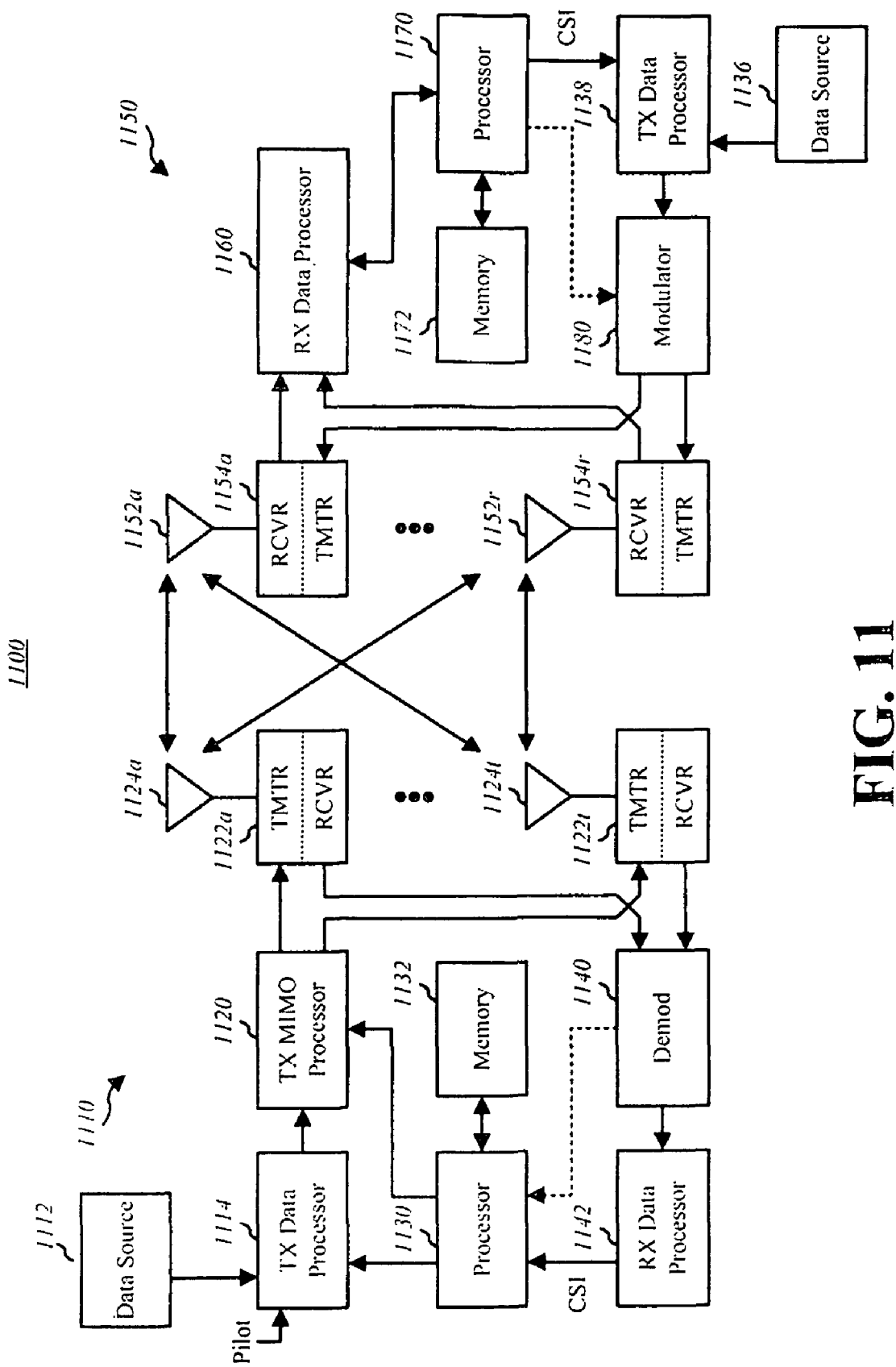

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

Figure 12:
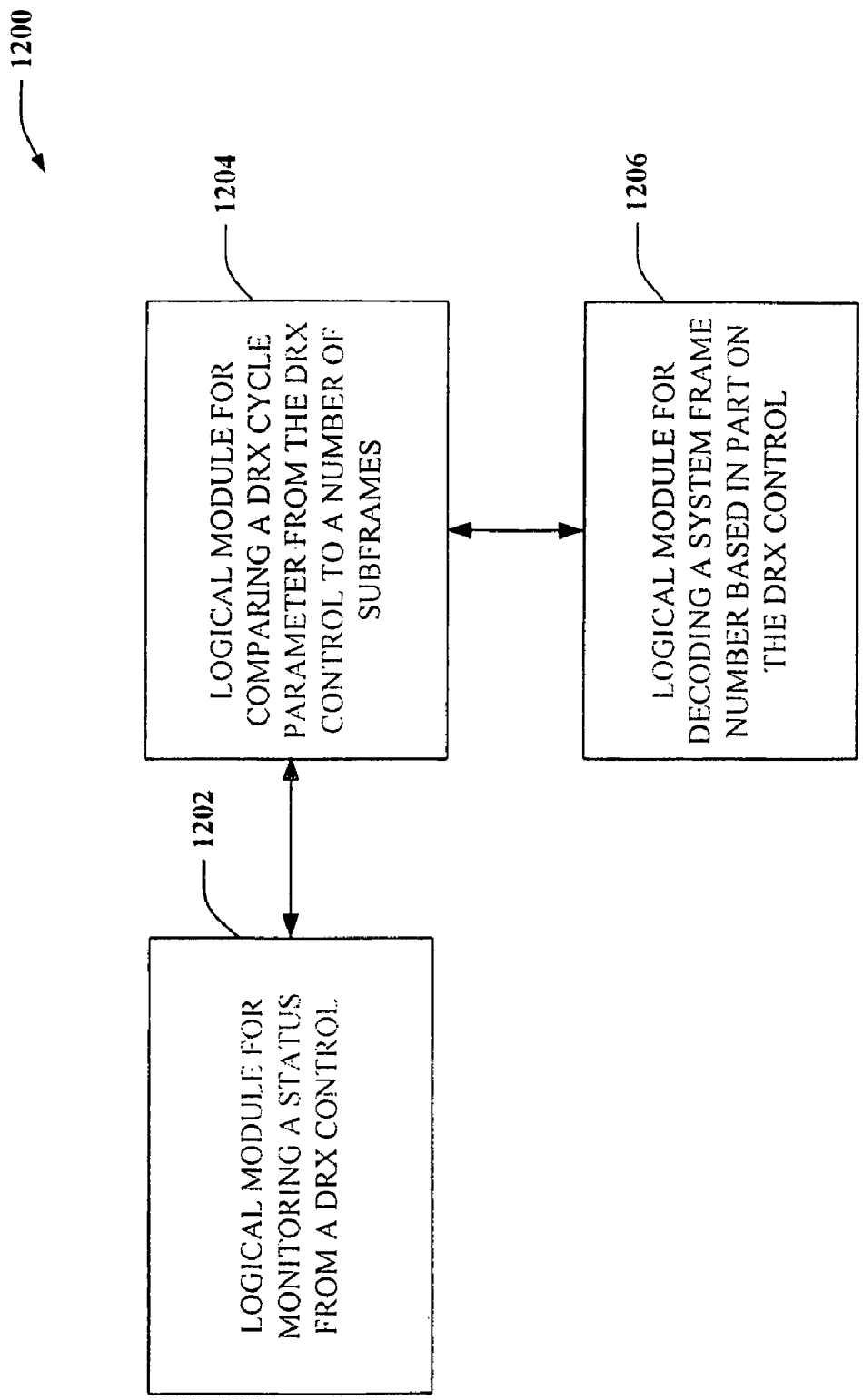
FIG. 12 illustrates an example logical module for cell identification.

Turning now to FIG. 12, a system is provided that relates to wireless signal processing. The system is represented as a series of interrelated functional blocks, which can represent functions implemented by a processor, software, hardware, firmware, or any suitable combination thereof.

A wireless communication system 1200 is provided. The system 1200 includes a logical module 1202 for monitoring a status from a DRX control and a logical module 1204 for comparing a DRX cycle parameter from the DRX control to a number of subframes. The system 1200 also includes a logical module 1206 for decoding a system frame number based in part on the DRX control.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A cell identification method, comprising:
    determining a discontinuous reception state in a wireless device;
    comparing a reception cycle to a parameter in the wireless device; and
    identifying a subsequent wireless cell within a predetermined time of the comparison, the predetermined time is dynamically adjusted to account for mobility speeds or environmental considerations.

2. The method of claim 1, further comprising identifying a subsequent wireless cell based in part on a detection of a system frame number (SFN) parameter.

3. The method of claim 1, the DRX is associated with a downlink (DL) active state.

4. The method of claim 3, the predetermined time is associated with a $T_{identify\ intra}$ parameter having a range of about 800 milliseconds to about 3 seconds.

5. The method of claim 4, further comprising processing the following process: If DL_DRX_Active=1 and device DRX cycle <X subframes, the device identifies and decodes a system frame number (SFN) parameter of a new detectable cell belonging to a monitored set within $T_{identify\ intra}$=a time A threshold, where A and X are positive integers.

6. The method of claim 4, further comprising processing the following process: If DL_DRX_Active=1 and device DRX cycle ≧X subframes, the device identifies and decodes a system frame number parameter (SFN) parameter of a new detectable cell belonging to a monitored set within $T_{identify\ intra}$=a time B value.

7. The method of claim 1, further comprising analyzing a speed parameter, a time from detection parameter, an update parameter, or a noise parameter to determine the predetermined time.

8. The method of claim 7, further comprising analyzing an active set parameter to determine the predetermined time.

9. The method of claim 1, further comprising detecting a cell based in part on a Common pilot channel (CPICH) parameter.

10. The method of claim 9, further comprising processing at least one synchronization code to determine the detection.

11. The method of claim 1, where the reception cycle is a cell related parameter.

12. The method of claim 1, where the reception cycle is related to a discontinuous reception (DRX.

13. The method of claim 12, where the reception cycle is a DRX reception cycle.

14. The method of claim 1, where the comparison parameter is in subframes.

15. The method of claim 14, where the comparison involves comparing a DRX cycle with a predetermined number of subframes.

16. A communications apparatus, comprising:
    a memory that retains instructions for monitoring a DRX status, comparing a parameter to a number of subframes, and adjusting a time parameter after the comparison, wherein the time parameter is dynamically adjusted to account for mobility speeds or environmental considerations;
    a processor that executes the instructions; and a component to identify a subsequent wireless cell based in part on a detection of a system frame number (SFN) parameter.

17. The apparatus of claim 16, the DRX status is associated with a downlink (DL) active state.

18. The apparatus of claim 16, the time parameter is associated with a $T_{identify\ intra}$ parameter having a range of about 800 milliseconds to about 3 seconds.

19. The apparatus of claim 18, further comprising a component to execute the following process: If DL_DRX_Active=1 and device DRX cycle <X subframes, the device identifies and decodes a system frame number (SFN) parameter of a new detectable cell belonging to a monitored set within $T_{identify\ intra}$=a time A threshold, where A and X are positive integers.

20. The apparatus of claim 19, further comprising a component to execute the following process: If DL_DRX_Active=1 and device DRX cycle ≧X subframes, the device identifies and decodes a system frame number (SFN) parameter of a new detectable cell belonging to a monitored set within $T_{identify\ intra}$=a time B value.

21. The apparatus of claim 16, further comprising a reception cycle that is a cell related parameter.

22. The apparatus of claim 21, where the reception cycle is related to a discontinuous reception (DRX.

23. The apparatus of claim 21, where the reception cycle is a DRX reception cycle.

24. The apparatus of claim 16, where the parameter is in subframes.

25. The apparatus of claim 24, further comprising a comparison that involves comparing a DRX cycle with a predetermined number of subframes.

26. A communications apparatus, comprising:
    means for monitoring a status of a wireless cell from a DRX control;
    means for comparing a DRX cycle parameter from the DRX control to a number of subframes;
    means for decoding a system frame number based in part on the DRX control; and a means for identifying a subsequent wireless cell based in part on a detection of a system frame number parameter.

* * * * *